United States Patent [19]

Bschorr

[11] 4,120,382
[45] Oct. 17, 1978

[54] WIDE-BAND VIBRATION DAMPER

[75] Inventor: Oskar Bschorr, Munich, Germany

[73] Assignee: Messerschmitt-Bolkow-Blohm Gesellschaft mit beschrankter Haftung, Munich, Germany

[21] Appl. No.: 722,128

[22] Filed: Sep. 10, 1976

[51] Int. Cl.² .................. F16F 7/00; G10K 11/04
[52] U.S. Cl. ................................. 188/1 B; 181/198; 181/207; 181/286
[58] Field of Search ........ 188/1 B; 181/198, 207–209, 181/211, 291, 286

[56] References Cited

U.S. PATENT DOCUMENTS

| | | | |
|---|---|---|---|
| 2,396,363 | 3/1946 | Du Bois et al. | 188/1 B X |
| 2,610,654 | 9/1952 | Ahlstrand | 188/1 B X |
| 2,722,194 | 11/1955 | Hoffman | 188/1 B X |
| 3,851,724 | 12/1974 | Banks | 181/208 |
| 4,005,858 | 2/1977 | Lochner | 188/1 B X |

FOREIGN PATENT DOCUMENTS 79,679  11/1962  France ................... 188/1 B
(Addition to No. 1,253,543)

*Primary Examiner*—Duane A. Reger
*Attorney, Agent, or Firm*—W. G. Fasse; W. W. Roberts

[57] ABSTRACT

A vibration damper for damping sound propagating in solids includes vibration damping horn members connected through a damping material to a support point on the surface of the solid in such a manner that a tapering portion of the horn member contacts the solid through the damping material. The taper in a horn member, for example of circular cross section, is considered to be the curvature of the horn member away from a generatrix of the horn member. The damping factor of the connecting damping material is equal or substantially equal to the terminal impedance of the horn member.

3 Claims, 10 Drawing Figures

WIDE-BAND VIBRATION DAMPER

BACKGROUND OF THE INVENTION

The invention relates to a wide-band vibration damper for reducing sound conducted in solids, with a horn part which can be fastened with its broad side to the body to be damped, in a positive force transmitting manner or in a force and moment transmitting manner, whereby sound waves conducted in solids may propagate in the horn part in its longitudinal direction and that the cross section of the horn part is tapered in such a manner that the spectral point impedance and the moment impedance relative to the fastening point of the vibration damper, and the coupling factor are adjusted in a manner known as such, while the tapered end of the horn member is terminated in a reflection free manner.

Such a vibration damper is capable of reducing vibrations conducted in solids, particularly such vibrations which emanate from wall elements whereby the vibration damper can vibrate in up to all six degrees of freedom. It may contain curved, helical or twisted horn parts as vibration conductors, the cross section of which is tapered in the direction of propagation in a manner known per se and which horn parts are damped. The impedance matrix of such elements comprises coupling members between the individual degrees of freedom of the vibration.

SUMMARY OF THE INVENTION

It is an object of the invention to improve a wide-band vibration damper of the aforementioned type in such a manner that it radiates still less sound and that it has a better sound shielding effect. According to the invention, this objective is achieved by the provision that the tapered end of the horn part is connected to a support point by means of a damping material. The body to be damped or, also, for instance the base of the horn part may serve as support points. As the tapered cross section of the horn part acts like a transformer which transforms the input vibration into large excursions but small vibration forces the velocity-proportional damping member can support itself, due to the reduced forces, on the component to be damped or on parts adjacent to the vibration damper. In this connection, it has been found advantageous if the damping factor or constant of the damping material is equal or approximately equal to the termination impedance of the horn part.

In order to increase the sound insulating effect by the wall stiffness in the lower frequency range and to obtain at the same time self-supporting wall elements, the new vibration damper is further characterized by contiguous, linear or areal horn members which are attached to the body to be damped in such a manner that the stiffness of the overall structure is increased.

In order to increase the impedance for a given frequency, the invention teaches to only partly attenuate the vibration in the horn part.

According to a further feature of the invention, the spectral impedance is influenced by the termination of the vibration damper. To obtain, for instance, resonance peaks, a not reflection-free termination is provided. This is achieved by attenuating the vibration in the horn part only incompletely, for peaking the impedance at given frequencies. However, it may also be advantageous to provide stiffness steps in the horn part. To preclude intercoupling in the case of curved horn parts, two mirror-symmetrical horn parts are joined together. According to the invention, the same effect can be accomplished, however, by symmetrically joining together four helical horn parts and two axes.

The invention will be explained in detail with reference to the following example embodiment. There is shown in:

BRIEF FIGURE DESCRIPTION

FIG. 1: a wall element with a corrugated (wavy) vibration damper;
FIG. 2: a wall element with rolled vibration dampers;
FIG. 3: a wall element with spiral vibration dampers;
FIG. 4: a wall element with helical vibration dampers;
FIG. 5: a wall element with scale-like vibration dampers;
FIG. 6: a wall element with a corrugated vibration damper in a flat type design;
FIG. 7: a wall element with an integrated vibration damper;
FIG. 8: a helical vibration damper;
FIG. 9: a vibration damper for hydraulic lines; and
FIG. 10: a re-entrant vibration damper

DETAILED DESCRIPTION OF PREFERRED EXAMPLE EMBODIMENTS

Figure 1:
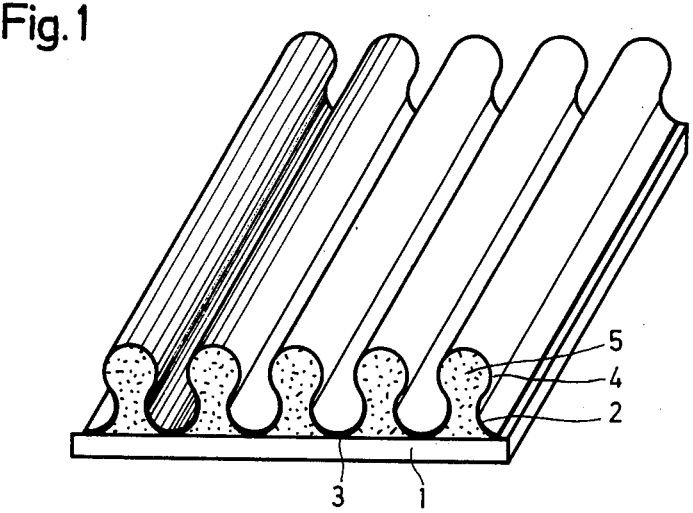

In FIG. 1 is shown a wall element, comprising the cover wall 1 and a corrugated vibration damper 2 in the form of horn members 4. The latter are connected to the cover wall 1 via fastenings 3, e.g., rivets, spot welds, etc. The cross section pattern and the radius of curvature of the vibration damper 2 or the horn members 4 are designed in accordance with the required impedance matrix relative to the fastening 3. The horn members 4 are made of a material with high internal damping such as lead or plastic material. The damping can also be achieved, however, by covering the horn members 4 with attenuating coatings or by foaming the cavities produced by the corrugations with damping materials 5.

If a sound wave strikes the cover wall 1, the motion in the normal direction forced thereby is introduced via the fastenings 3 into the horn members 4. There, the motion in the direction of the normal propagates essentially as a flexure wave in the direction of the tapered cross section. Due to the tapering of the cross section, the velocity of propagation is reduced, and thereby the wave length of the flexural vibration is also reduced, whereby the necessary attenuation path length is decreased accordingly. The damping effect of the wall element is independent of the side and the angle of incidence of the sound wave. In order to reduce, particularly in the case of encapsulations, the reverberation of the interior of the capsule, it is advantageous to line the latter with absorbing material in a manner known per se.

The wall element according to FIG. 1 has great stiffness in the direction of the corrugated horn members 4, while it is relatively flexible in the transversal direction. In order to obtain high flexural strength also in the transversal direction, ribs may be used, or two wall elements with mutually perpendicular corrugations may be joined together crosswise.

Figure 2:
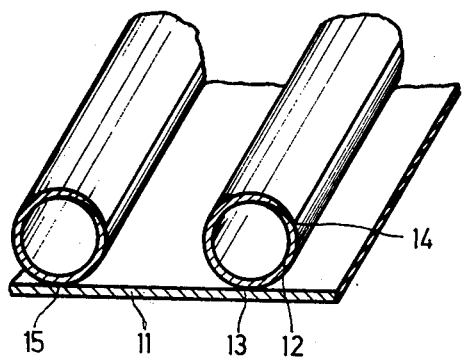

The wall element according to FIG. 2, comprises a cover wall 11 and rolled horn parts 12. The latter are fastened to the cover wall 11 in the area 13. As seen from the fastening point 13, the cross section of the horn part 12 tapers toward both sides. The free ends 14 overlap and are connected to the fastening point 13 or the base of the horn part 12 via a viscous attenuating coating 15. If the damping factor of the attenuating coating 15 is matched to the impedance of the free end 14, the vibrating motion of the latter can be attenuated over a short distance. Owing to the transformer action of the cross-section tapering, the vibration forces at the free end 14 are reduced so that the reaction of the latter is insignificant.

Figure 3:
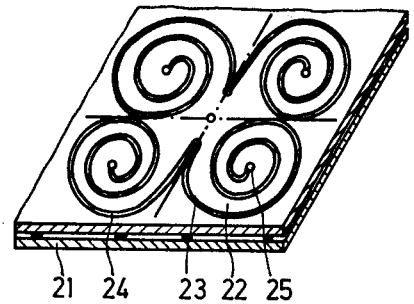

FIG. 3 shows an example embodiment with spiral horn members 22, which are attached to the cover wall 21 by the fastenings 23. The spiral arms 24 of the horn members 22 have a certain distance from the cover wall 21 and also from each other so that they can vibrate freely. The cross-section pattern (width and thickness of the spiral arms 24) and the curvature depend on the required impedance matrix. Contrary to the embodiment examples as per FIGS. 1 and 2, the spiral horn members 22 are additionally excited to execute torsion vibrations. In order to eliminate couplings between the individual degrees of freedom of the vibration which might be troublesome, four horn members 22 are advantageously joined together in such a manner that symmetry with respect to the two axes results. Thereby, the coupling factors mutually cancel each other and a damping, free of coupling, is obtained in the direction of the normal to the cover wall 1. The horn members 22 are made of a material having a high internal damping, or they are provided with damping coatings. Advantageously, these are applied between the individual turns of the spirals, so that the damping is obtained due to the relative motion of the turns of the spirals with respect to each other. In order to increase the impedance, two or more-story layers of horn members 22 are possible. In order to reduce the spacing of the fastening points 23, the individual layers are arranged in staggered fashion. In order to obtain resonance peaking of the impedance matrix, the horn members 22 may have end masses 25. Resonance peaking can be achieved in general by not reflection-free terminations.

Figure 4:
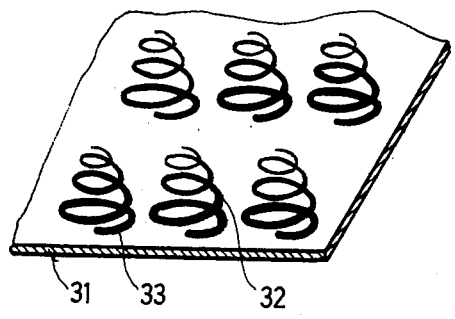

The example embodiment according to FIG. 4 is substantially analogous to that of FIG. 3. Helical horn members 32 are attached by means of fastenings 33 on a covering skin 31. The horn members 32 may be made of wire or bristles. The covering skin 31 may be flexible, with the horn members 32 accordingly arranged close together. The skin 31 may be made of foil or an air-impervious fabric. Such an embodiment is suited particularly as a noise curtain. The cross-section and stiffness reduction of the horn members 32 can be achieved also by combining several individual bristles of different length. The mutual friction of the individual bristles increases simultaneously the vibration damping.

Figure 5:
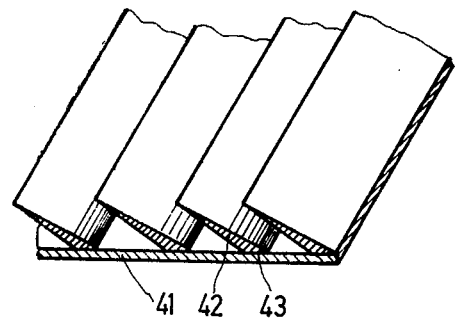

FIG. 5 represents an example embodiment with horn members 42 arranged in fish scale fashion. These members 42 are attached to a cover wall 41 for positive transmission of force and moment. To increase the number of degrees of freedom, horn parts of spiral design according to the embodiment of FIG. 3, can be used instead of the horn members 42.

Figure 6:
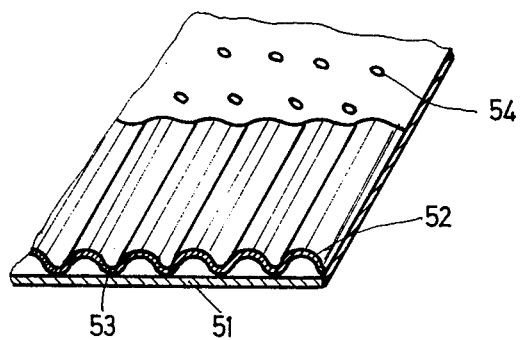

In the example embodiments of FIGS. 1 to 5, the desired cross-section pattern of the horn members 2, 12, 22, 32 and 42 was essentially obtained by virtue of thickness and/or width. In the example embodiment of FIG. 6, the bending stiffness of the vibration damper in the direction of the propagation is reduced, with the cross section practically the same. This is achieved by the provision that the individual horn members 52 have a waviness which decreases in the direction of propagation, whereby the wave length of the vibrations introduced by the cover wall 51 via the fastening points is also decreased. The air cushioning between the cover wall 51 and the horn member 52 may be reduced by equalization holes 54. Also the spectral impedance matrix can be influenced by the size and arrangement of the equalization holes. In particular, resonance peaking is possible thereby. If the equalization holes 54 have fine pores, the forced air motion can at the same time be used as a velocity-proportional damping mechanism. The same effect is also achieved by damping materials between the horn member 52 and the cover wall 51 to be damped. The principle of changing stiffness, applied in FIG. 6, may logically be used also in lieu of the cross section tapering in FIGS. 1 to 5.

Figure 7:
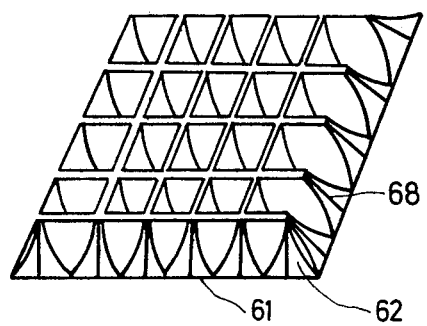

In FIG. 7, a wall element is shown which comprises a cover layer 61 and horn members 62 placed thereon. The horn members 62 form a cross-braced structure in the manner shown. For better attenuation, continuous sheet metal strips 68 of a material with a larger coefficient of elasticity than the horn members 62 are provided in the latter. These strips are connected to the cover layer 61, so that rapid attenuation is obtained due to the relative motion, particularly in the tapered portion of the horn member. Because of the cross-bracing of the sheet metal strips 68, the stiffness of the cover wall 61 is additionally increased. If the horn members 62 are made of open-pore material, or coated with such, air-borne sound absorption can be obtained in the manner of the $\lambda/4$ wedges.

Figure 8:
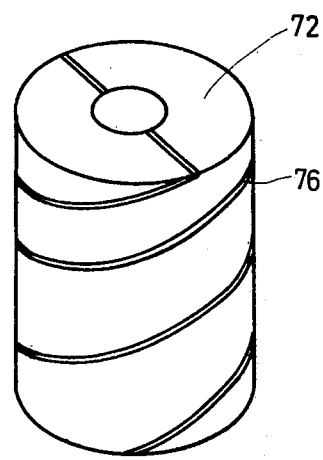

In FIG. 8, an example embodiment with a horn member 72 coiled in the manner of a helical spring, is shown. In order to equalize tilting moments due to intercoupling, it is advantageous to provide two or multi-threaded coils. For damping, a damping coating 76 can be disposed in the spaces between the horn members 72.

Figure 9:
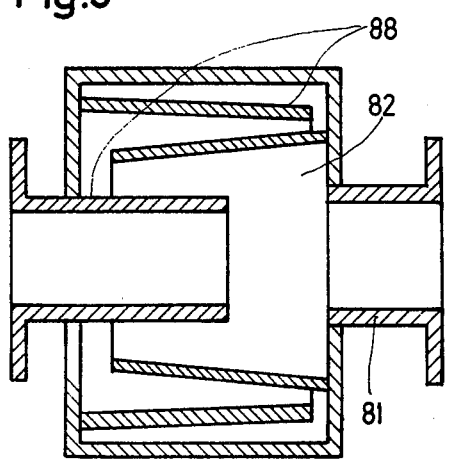

FIG. 9 shows an example embodiment for damping hydraulic lines and the like. The horn member 82 is disposed in the line section 81. The horn member 82 is formed by concentric rings 88, the dimensions of which are chosen so that the cross section area of the ring gaps becomes continuously smaller. The ring gaps are connected to the line section 81 and are likewise filled with the working fluid. Vibrations of the working fluid, caused by pumps or consumers, also propagate in the horn member 82; they are concentrated on the smaller area by the narrower gap cross sections and are damped. Instead of the free connection of the line section 81 and the horn member 82, covering by a diaphragm can also be provided.

Figure 10:
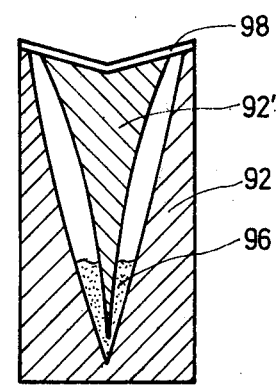

FIG. 10 shows an example embodiment of a vibration damper with a shortened overall length. The horn member 92 is connected to the reverse horn member 92' via an element 98 which positively transmits forces and moments. If designed as a rotation-symmetrical structure, the element 98 represents a conical part of great stiffness. If designed long and in strip-form, the element 98 is a strip of material which has transversal corrugations to increase the stiffness. For damping, the free end of the horn member 92° projects into a suitable detent notch 96.

In the example embodiments of FIGS. 1 to 10, the intended use was primarily for machine installations. The example embodiments shown may be applied logically also to protect buildings against vibration, to damp residential noise, etc. Advantageously, the horn members are made of materials common in construction practice, e.g., concrete, and are integrated into the structure. The boundaries of the horn parts and at the same time the pouring form are formed by thin-walled volume-elastic materials such as styrofoam.

What is claimed is:

1. A wide-band vibration damper for reducing sound propagation in a solid body comprising first horn means having a recess therein, reverse horn means having a wide end and a narrow end, and a force transmission element, said reverse horn means being disposed in said recess of said first horn means, said reverse horn means being connected at its wide end to the first horn means by said force transmission element and damping material means connecting said reverse horn means at its narrow end to said first horn means.

2. The wide-band vibration damper of claim 1, wherein the force transmission element is a stiff conical part.

3. The wide-band vibration damper of claim 1, wherein the force transmission element is a stiff strip.